US009635450B2

(12) United States Patent
Drinkwater et al.

(10) Patent No.: US 9,635,450 B2
(45) Date of Patent: Apr. 25, 2017

(54) AUDIO HEADPHONES FOR VIRTUAL REALITY HEAD-MOUNTED DISPLAY

(71) Applicant: Oculus VR, LLC, Menlo Park, CA (US)

(72) Inventors: Jared I. Drinkwater, Auburn, WA (US); Blake Francis Andersen, Seattle, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 0 days.

(21) Appl. No.: 14/627,639

(22) Filed: Feb. 20, 2015

(65) Prior Publication Data
US 2016/0249124 A1    Aug. 25, 2016

(51) Int. Cl.
H04R 25/00 (2006.01)
H04R 1/10 (2006.01)
G02B 27/01 (2006.01)

(52) U.S. Cl.
CPC ......... H04R 1/105 (2013.01); G02B 27/0176 (2013.01)

(58) Field of Classification Search
CPC .......................... H04R 5/0335; H04R 1/1058
USPC .......................... 381/376; 2/2, 423
See application file for complete search history.

(56) References Cited

U.S. PATENT DOCUMENTS

| 5,321,416 A * | 6/1994 | Bassett | A42B 3/145 345/8 |
| 5,767,820 A * | 6/1998 | Bassett | G02B 27/017 345/7 |
| 2012/0033142 A1* | 2/2012 | Thomson | G02B 7/002 348/838 |

* cited by examiner

Primary Examiner — Curtis Kuntz
Assistant Examiner — Julie X Dang
(74) Attorney, Agent, or Firm — Morgan, Lewis & Bockius LLP

(57) ABSTRACT

An audio headphone to couple to a strap for a head-mounted display is disclosed. The audio headphone includes a headphone speaker, a strap connector, and a four-bar linkage coupled to the strap connector to provide inward and outward movement of the headphone speaker with respect to a user's ear. The four-bar linkage comprises a first member coupled to the strap connector via a first joint, a second member coupled to the first member via a second joint, a third member coupled to the second member via a third joint, and a fourth member connected to the third member and coupled to the first member via a fourth joint. The fourth member is further coupled to the strap connector via a fifth joint. The third member comprises one or more rigid poles extending from the second member to the fourth member and surrounded by one or more respective elastic springs.

20 Claims, 20 Drawing Sheets

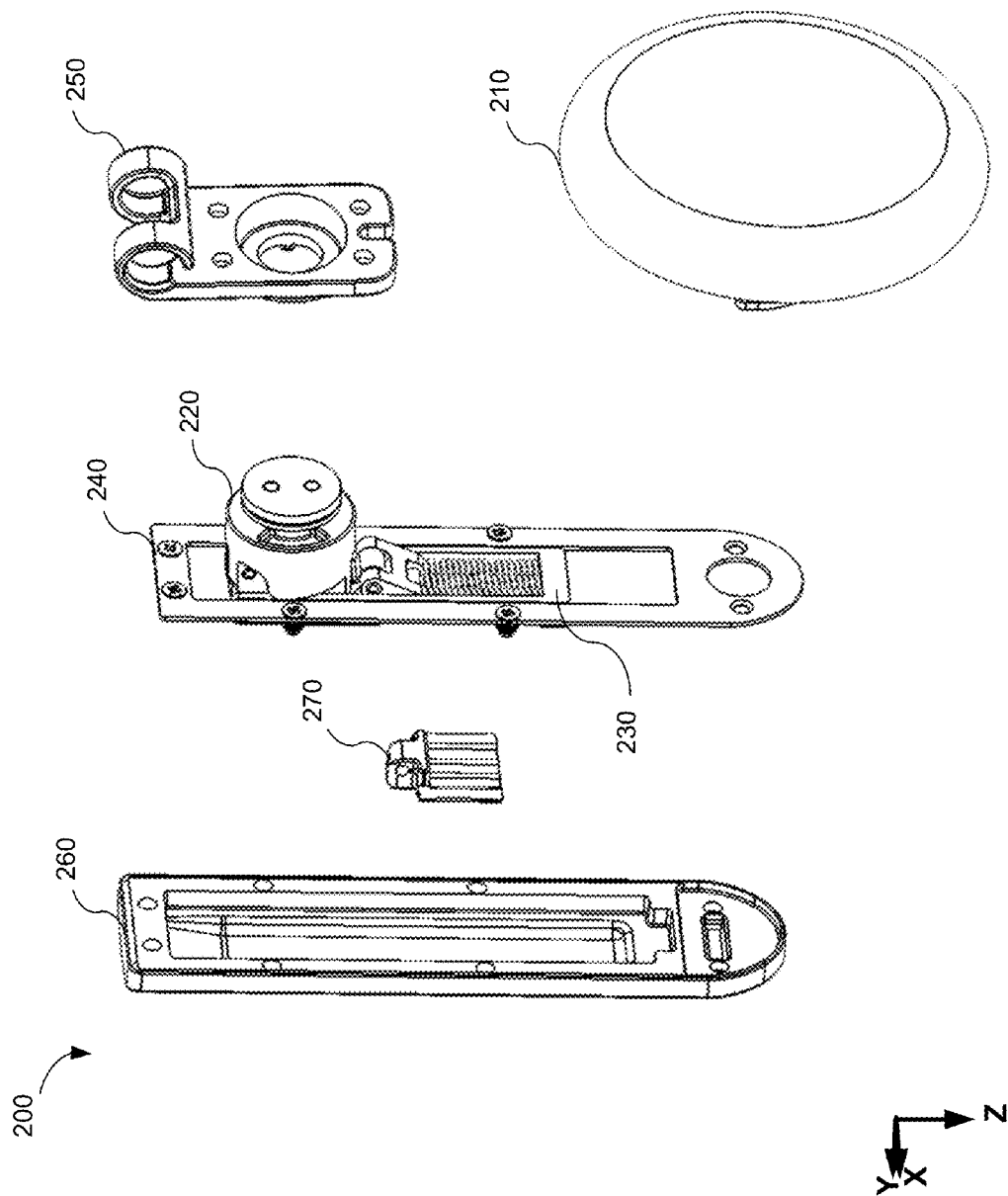

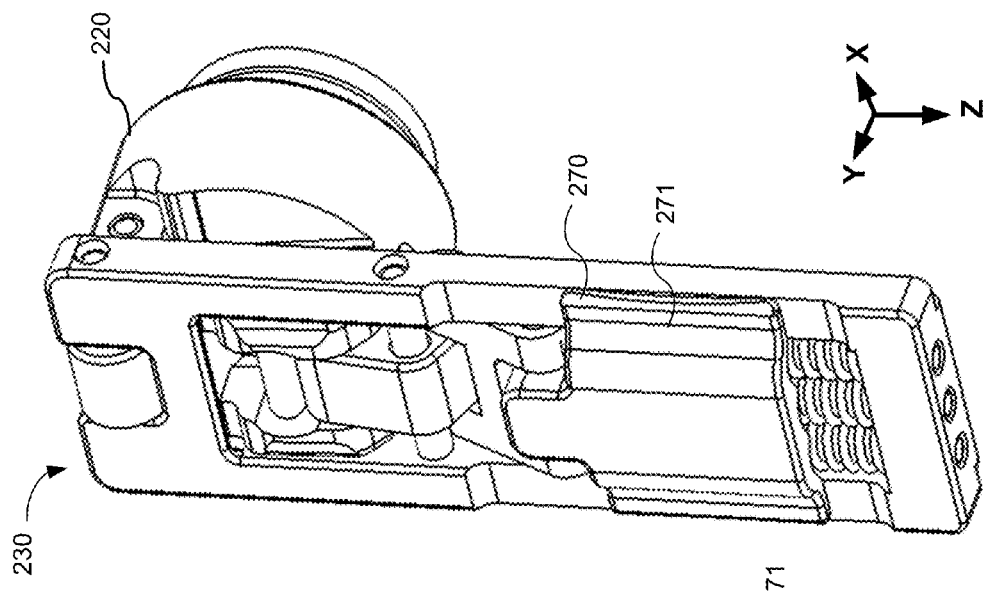
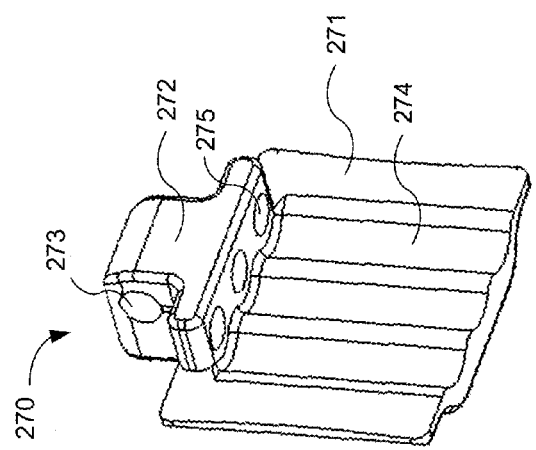
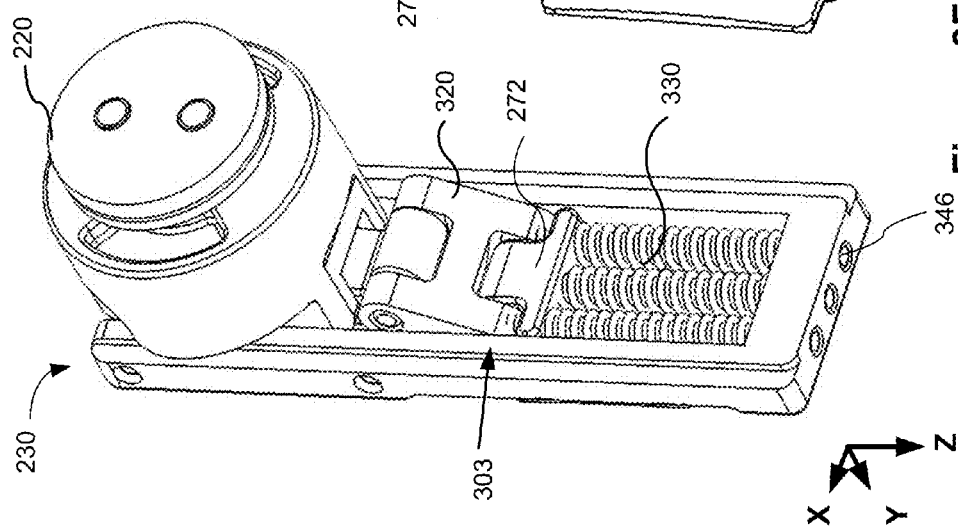
Figure 3G
Figure 3F

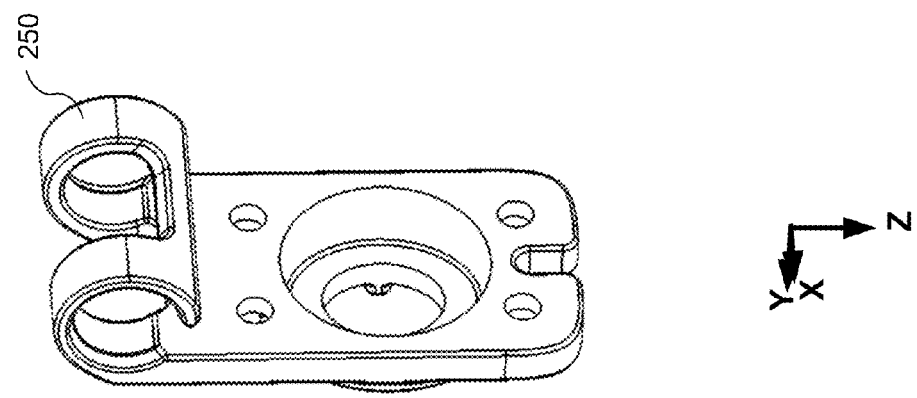
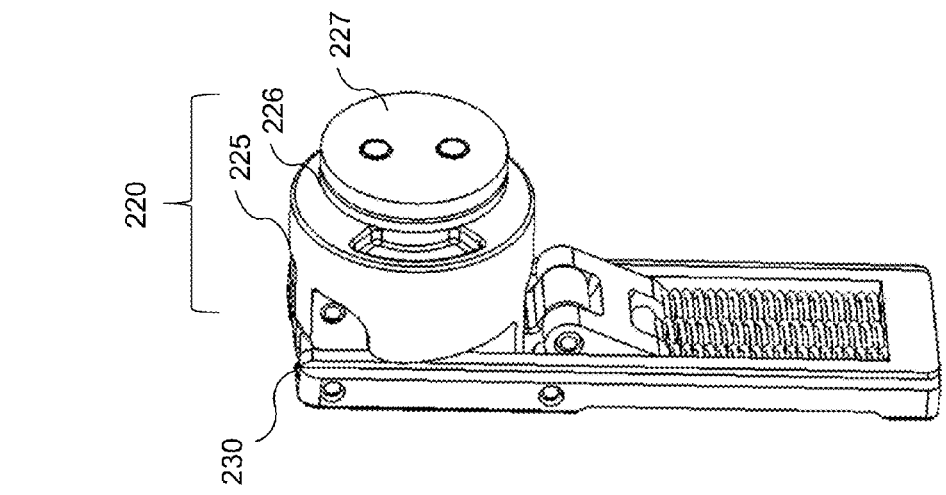
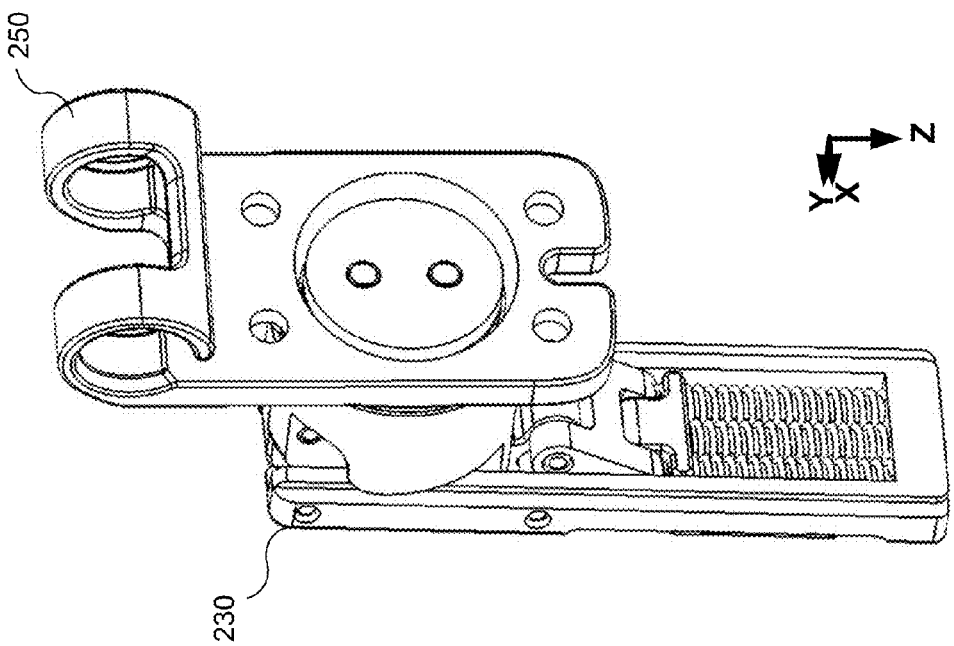
Figure 4C
Figure 4B

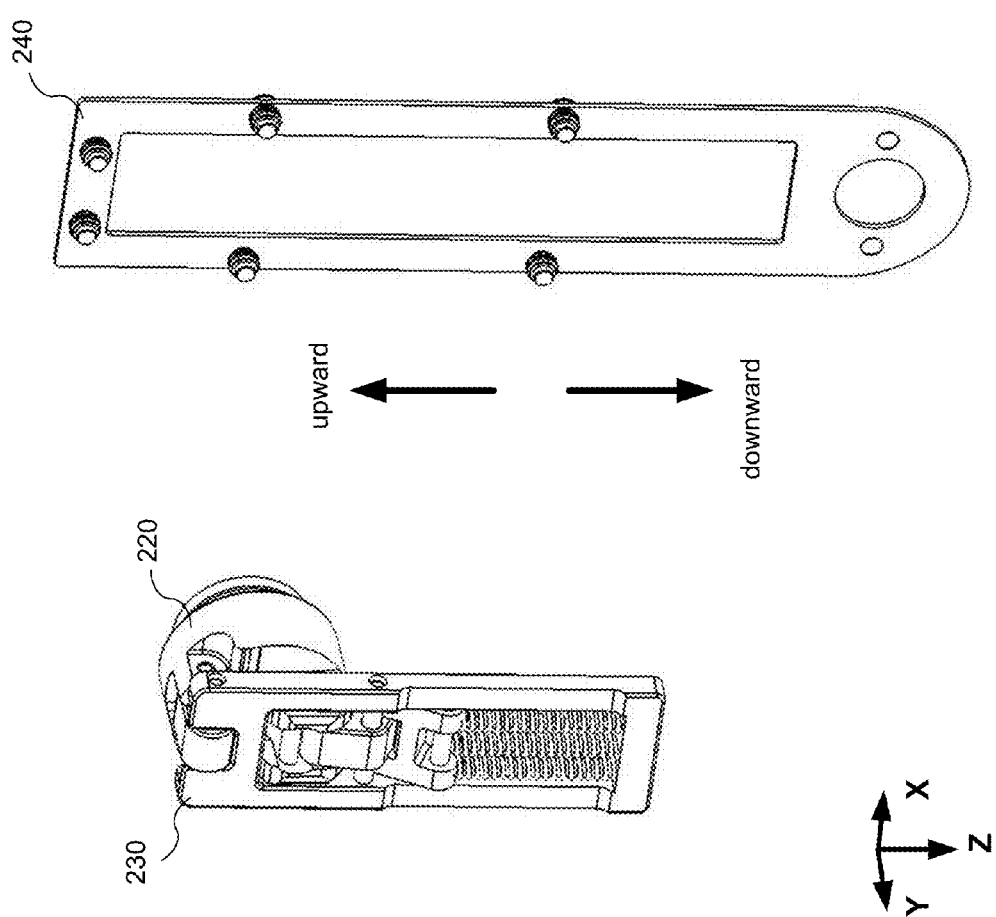

AUDIO HEADPHONES FOR VIRTUAL REALITY HEAD-MOUNTED DISPLAY

TECHNICAL FIELD

This application relates generally to wearable technology and virtual reality technology, including but not limited to an audio headphone for a virtual reality head-mounted display.

BACKGROUND

Virtual reality head-mounted displays have wide applications in various fields, including engineering design, medical surgery practice, military simulated practice, and video gaming. For example, a user wears a virtual reality head-mounted display integrated with an audio headphone while playing video games so that the user can have an interactive experience in an immersive virtual environment.

However, it may be difficult for a user to properly adjust and comfortably wear the head-mounted display and the integrated audio headphone using the existing virtual reality technology, which may negatively affect the user's experience.

SUMMARY

The embodiments of the present disclosure provide an audio headphone to couple to a strap for a head-mounted display. In accordance with some embodiments, an audio headphone includes a headphone speaker; a strap connector; and a four-bar linkage coupled to the strap connector to provide inward and outward movement of the headphone speaker with respect to a user's ear. The four-bar linkage comprises a first member, a second member, a third member, and a fourth member. The first member has a first end portion coupled to the strap connector via a first joint; the second member has a first end portion coupled to a second end portion of the first member via a second joint; the third member has a first end portion coupled to a second end portion of the second member via a third joint, the third member comprising a rigid pole extending from the second member to the fourth member and surrounded by an elastic spring; and the fourth member has a first portion coupled to the rigid pole and first and second sides that are connected by the first portion and that extend along a vertical dimension. The first member is further coupled to the first and second sides of the fourth member via a fourth joint. The fourth member has a second portion coupled to the strap connector via a fifth joint.

In accordance with some embodiments, a head-mounted system provides virtual reality experience for a user. The head-mounted system comprises a head-mounted display; a strap system for mounting the head-mounted display on the user's head; and first and second audio headphones coupled to the strap system and integrated with the head-mounted display. The strap system comprises first and second flexible segments that are stretchable; first and second rigid guide segments coupled to the first and second flexible segments respectively, the first and second rigid guide segments further connected to the head-mounted display, wherein the first and second flexible segments are stretchable within the first and second rigid guide segments respectively along the lateral dimension so as to adjust the strap system in accordance with the user's head; and at least one semi-rigid segment, coupled to the first and second rigid guide segments, to conform to a portion of the user's head, the at least one semi-rigid segment comprising arc portions to extend from above the user's ears to below the user's occipital lobe. Each of the first and second the audio headphones comprises a headphone speaker; a strap connector coupling the audio headphone to the first or second rigid guide segment of the strap system; and a four-bar linkage, coupled to the strap connector to provide inward and outward movement of the headphone speaker with respect to a user's ear. The four-bar linkage comprises a first member, a second member, a third member, and a fourth member. The first member has a first end coupled to the strap connector via a first joint; the second member has a first end coupled to a second end of the first member via a second joint; the third member has a first end coupled to a second end of the second member via a third joint, the third member comprising a rigid pole extending from the second member to the fourth member and surrounded by an elastic spring; and the fourth member has a first portion coupled to the rigid pole and first and second sides that are connected by the first portion and that extend along a vertical dimension. The first member is further coupled to the first and second sides of the fourth member via a fourth joint. The fourth member has a second portion coupled to the strap connector via a fifth joint.

In accordance with some embodiments, an audio headphone arm to couple to a strap for a head-mounted display comprises a four-bar linkage to provide inward and outward movement of a headphone speaker with respect to a user's ear, and a frame to couple to the headphone speaker. The four-bar linkage comprises a first member, a second member, a third member, and a fourth member. The first member includes a bend at a mid portion; the second member has a first end coupled to an end of the first member via a first joint; the third member has a first end coupled to a second end of the second member via a second joint, the third member comprising a rigid pole extending from the second member to the fourth member and surrounded by an elastic spring; and the fourth member has a first portion connected to the rigid pole and first and second sides that are connected by the first portion and that extend along a vertical dimension, the mid portion of the first member coupled to mid portions of the first and second sides of the fourth member at a third joint. The four-bar linkage is to couple to a strap connector through an opening in the frame. The frame is to slide upward and downward with respect to the four-bar linkage.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 2A-2C are perspective views of a plurality of components of an audio headphone in accordance with some embodiments.

FIGS. 3F-3G are perspective views of a four-bar linkage comprising a spring cover and coupled with a strap connector of an audio headphone in accordance with some embodiments.

FIGS. 4B-4E are perspective views of a mount and a strap connector coupled with a four-bar linkage of an audio headphone in accordance with some embodiments.

FIGS. 5B-5C are perspective views of a frame and a strap connector coupled with a four-bar linkage of an audio headphone in accordance with some embodiments.

Like reference numerals refer to corresponding parts throughout the several views of the drawings.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
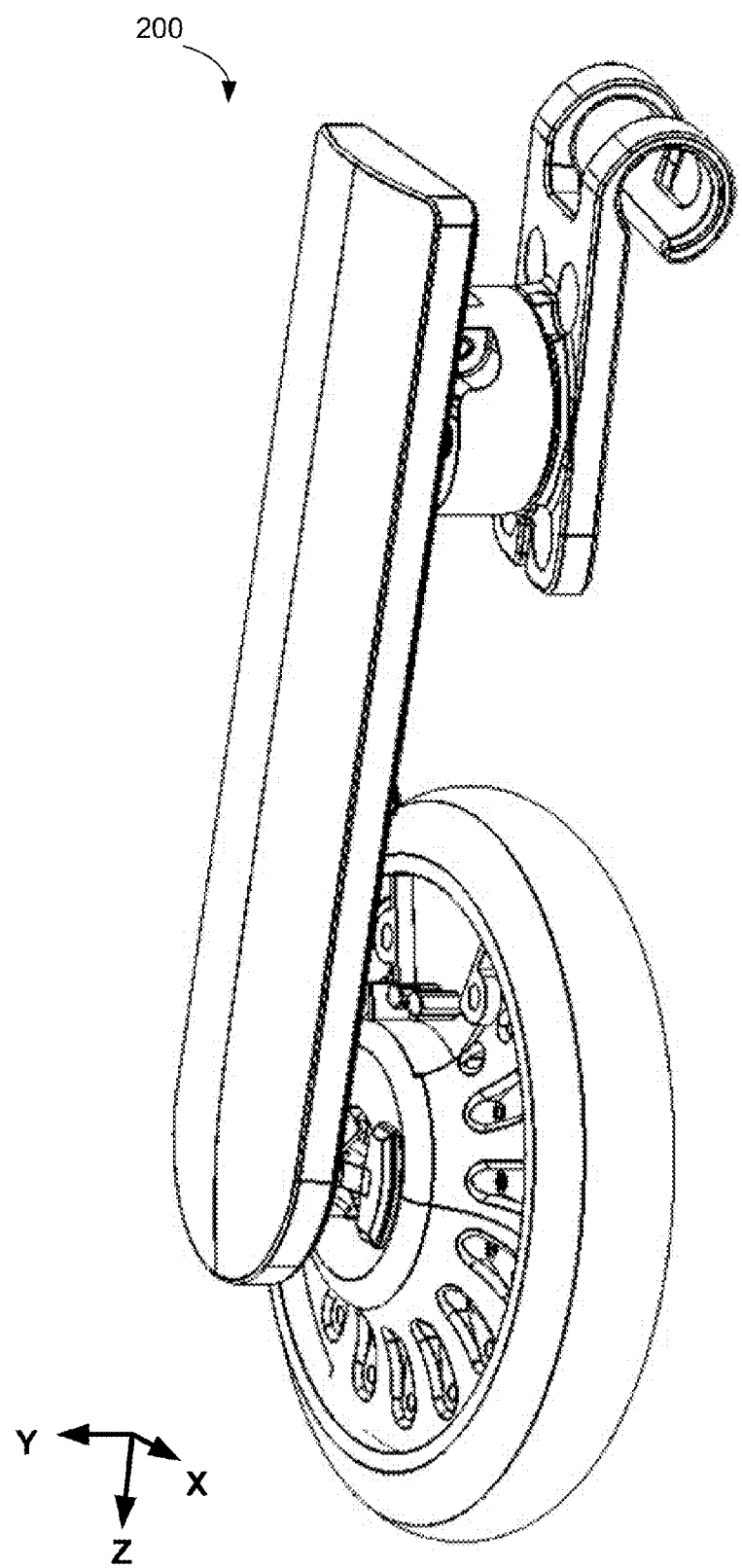
FIGS. 1A-1B are perspective views of an audio headphone for a head-mounted display in accordance with some embodiments.
Figure 1B:
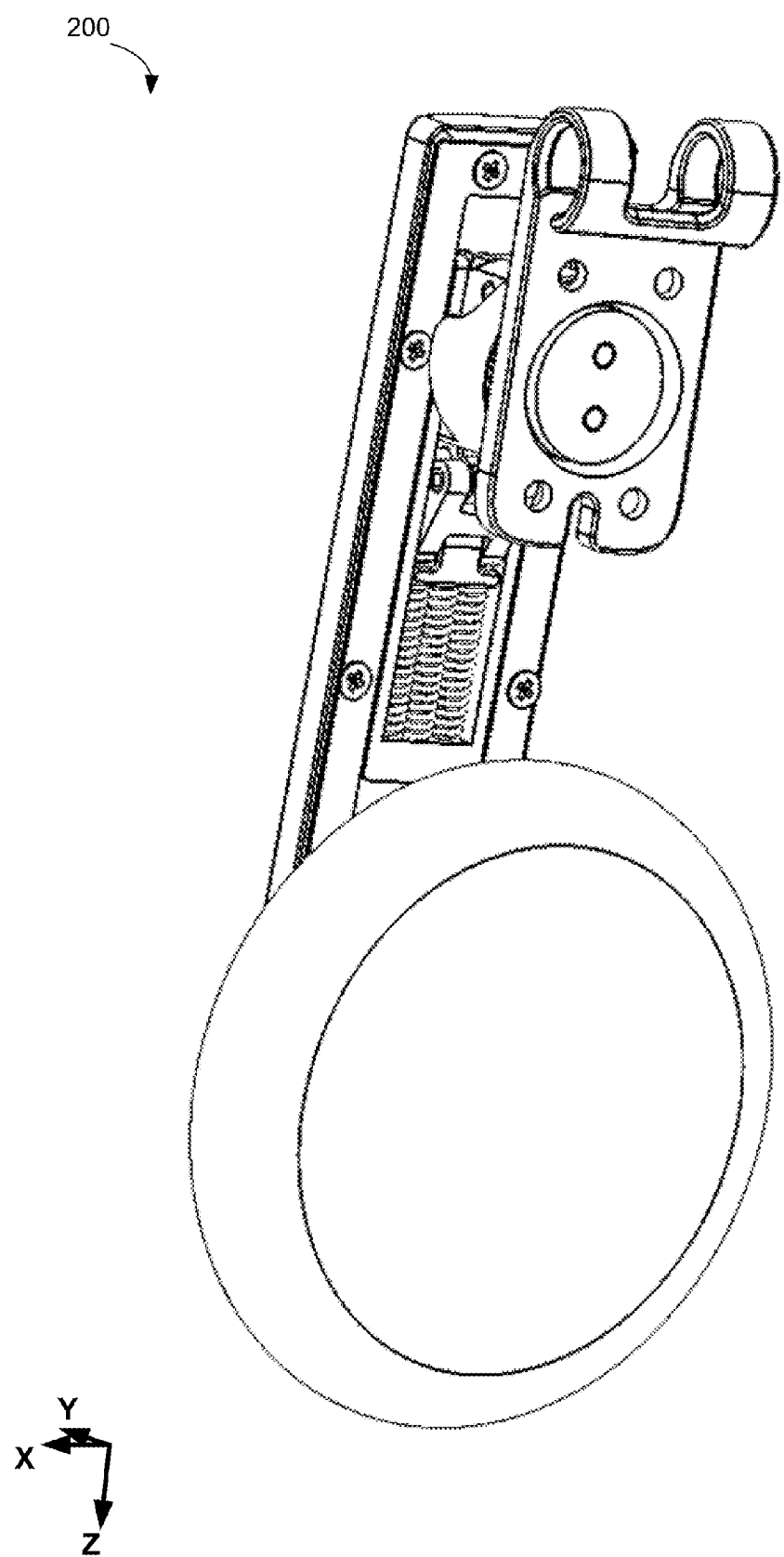

FIGS. 1A-1B are perspective views of an audio headphone 200 for a head-mounted display in accordance with some embodiments. The audio headphone 200 as shown in FIGS. 1A-1B can be coupled to a strap (e.g., a strap system 100 in FIG. 6A) for a head-mounted display (e.g., a head-mounted display 710 in FIG. 6B) and integrated with the head-mounted display to provide audio signals. For example, the audio headphone 200 can be attached to the strap and integrated with the virtual reality head-mounted display to provide an immersive 3D visual and audio experience to the user.

Figure 2A:
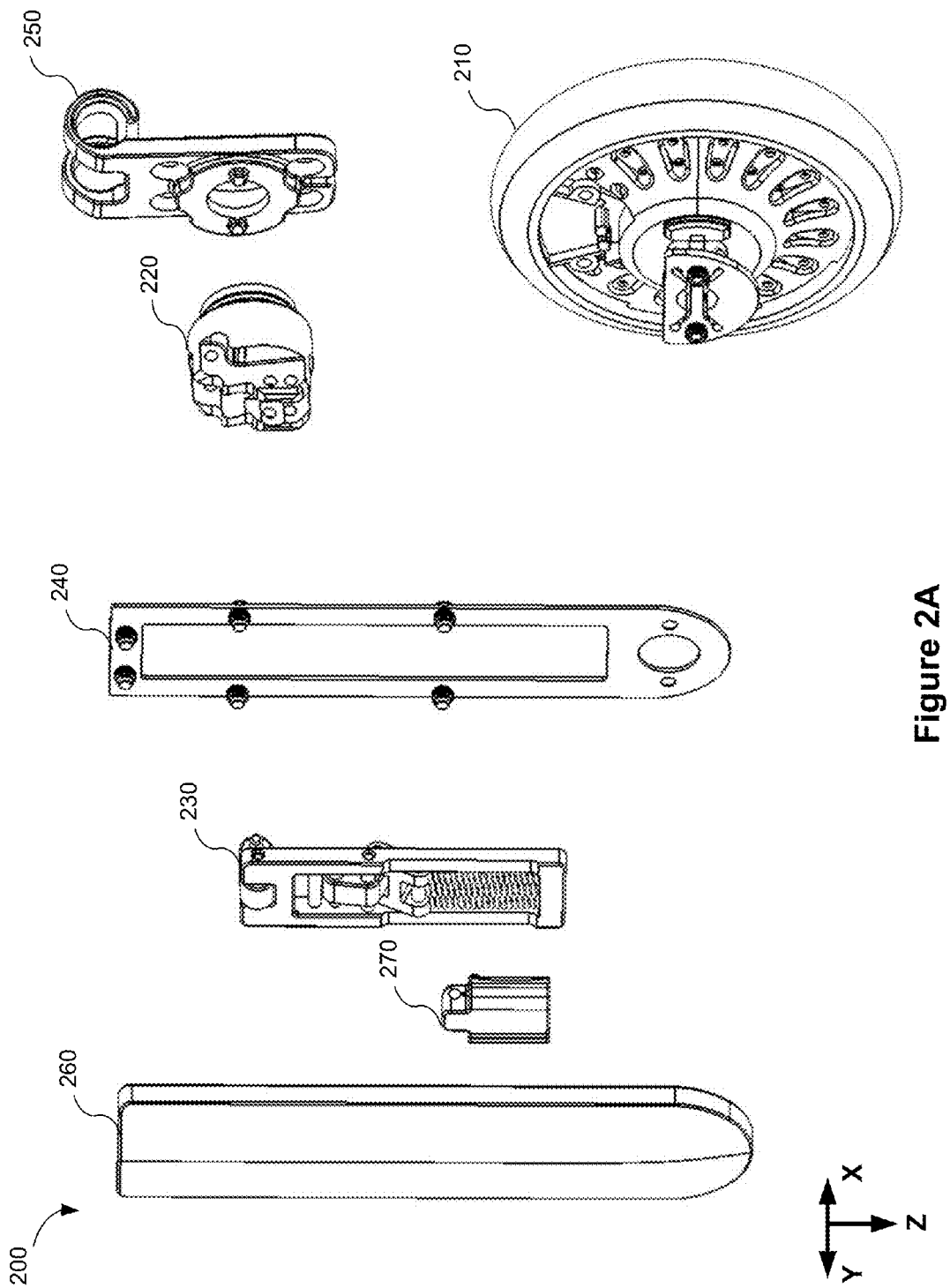
Figure 2B:
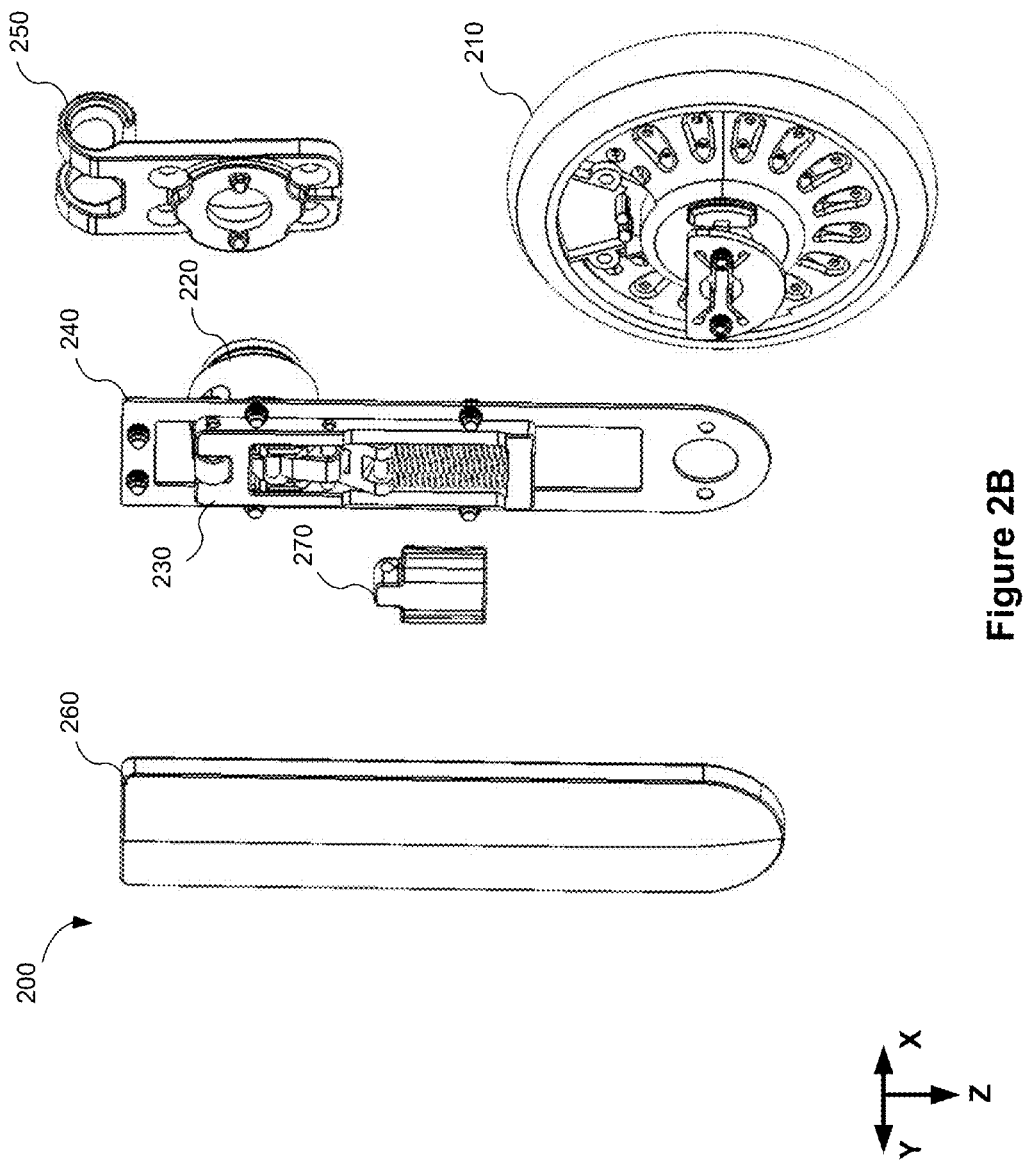

FIGS. 2A-2C are perspective views of a plurality of components of the audio headphone 200 in accordance with some embodiments. As shown in FIGS. 2A-2C, the audio headphone 200 comprises a headphone speaker 210 configured to provide audio signals to the user's ear. The headphone speaker 210 can be an on-ear headphone, an around-ear headphone, an over-ear headphone, an in-ear headphone, or any other suitable style.

As shown in FIGS. 2B-2C, the audio headphone 200 also comprises a strap connector 220 and a four-bar linkage 230 that are coupled to each other. The audio headphone 200 further comprises a frame 240 that can be coupled to the headphone speaker 210 as illustrated in FIGS. 1A-1B. Optionally, the audio headphone 200 comprises a mounting bracket 250 that can be coupled to the strap connector 220 and is connectable to the strap for the head-mounted display. The audio headphone 200 may also comprise a frame cover 260 and a spring cover 270.

Figure 3A:
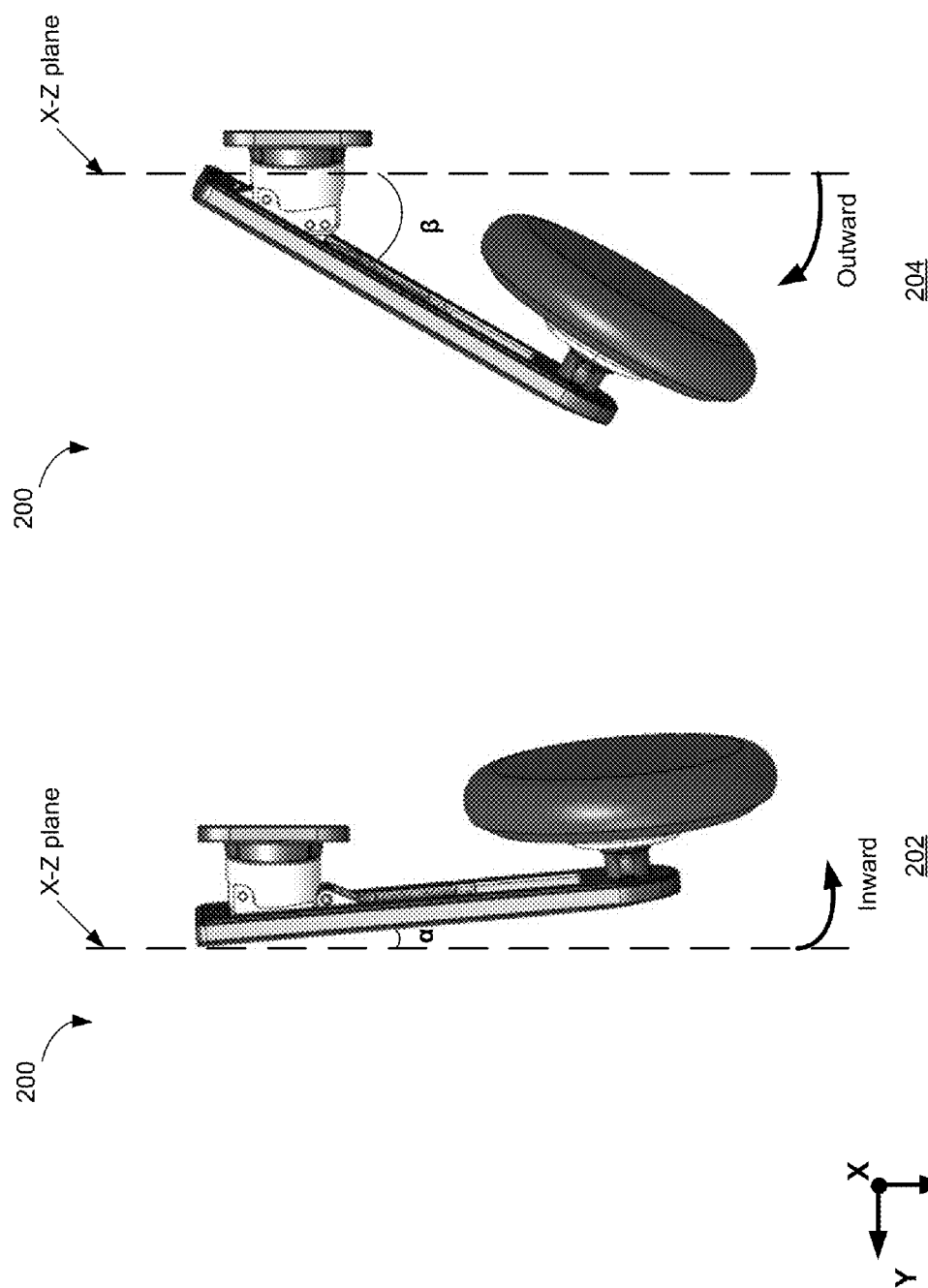
FIG. 3A is a perspective view of an audio headphone at bi-stable states in accordance with some embodiments.

FIG. 3A is a perspective view of the audio headphone 200 at bi-stable states in accordance with some embodiments. In some embodiments, the four-bar linkage 230 as coupled with the strap connector 220 allows the audio headphone 200 to pivot in the Y-Z plane inward and outward with respect to the user's ear between bi-stable states.

As shown in FIG. 3A, the bi-stable states include a first stable position 202, e.g., an in-use position 202, and a second stable position 204, e.g., an out-of-use position 204. When the audio headphone 200 is connected to a strap mounted on a user's head, the headphone speaker 210 contacts the user's ear when in the in-use position 202 (assuming it does not contact the user's ear before reaching the in-use position 202, in which case it would not reach the in-use position and instead would press on the user's ear) and is clear of the user's ear in the out-of-use position 204. In some embodiments, the in-use position 202 is at a position inward from the vertical plane (e.g., the X-Z plane) with a rotation angle $\alpha$ in a range from $-1°$ to $-10°$. For example, the in-use position 202 is at $-5°$ inward from the vertical plane (e.g., the X-Z plane). In some embodiments, the out-of-use position 204 is at a position outward from the vertical plane (e.g., the X-Z plane) with a rotation angle $\beta$ in a range from $25°$ to $35°$. For example, the out-of-use position 204 is at $28°$ outward from the vertical plane (e.g., the X-Z plane). In FIG. 3A, the rotation angle in the clockwise direction is positive, and the rotation angle in the counter-clockwise direction is negative.

Figure 3C:
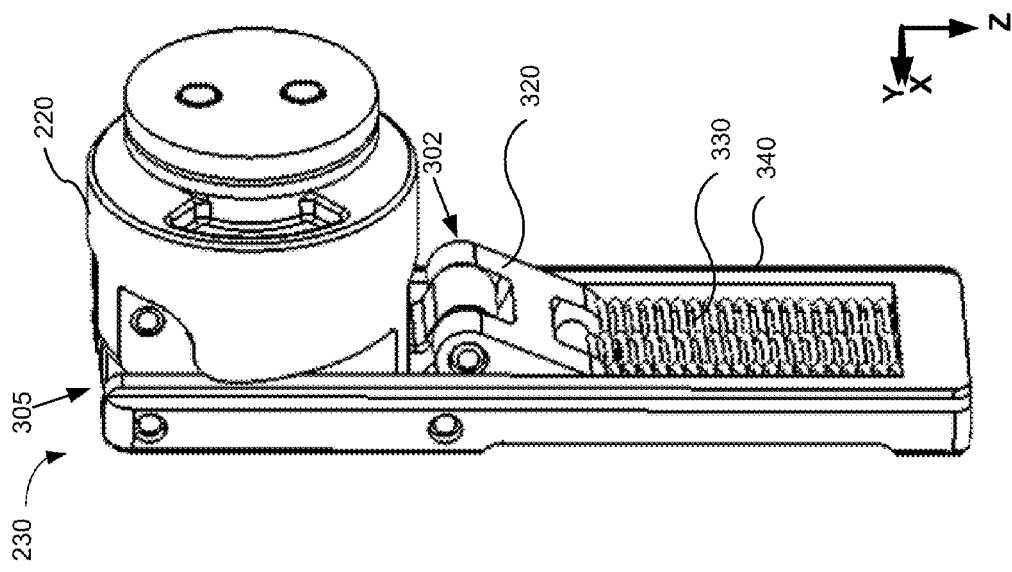
FIGS. 3B-3C are perspective views of a four-bar linkage coupled with a strap connector of an audio headphone in accordance with some embodiments.
Figure 3B:
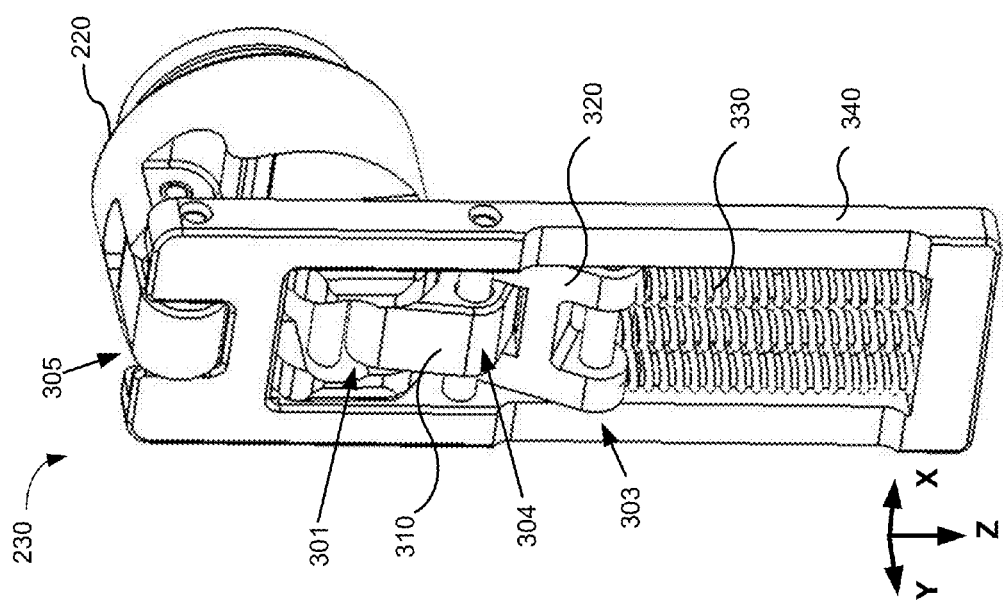
Figure 3D:
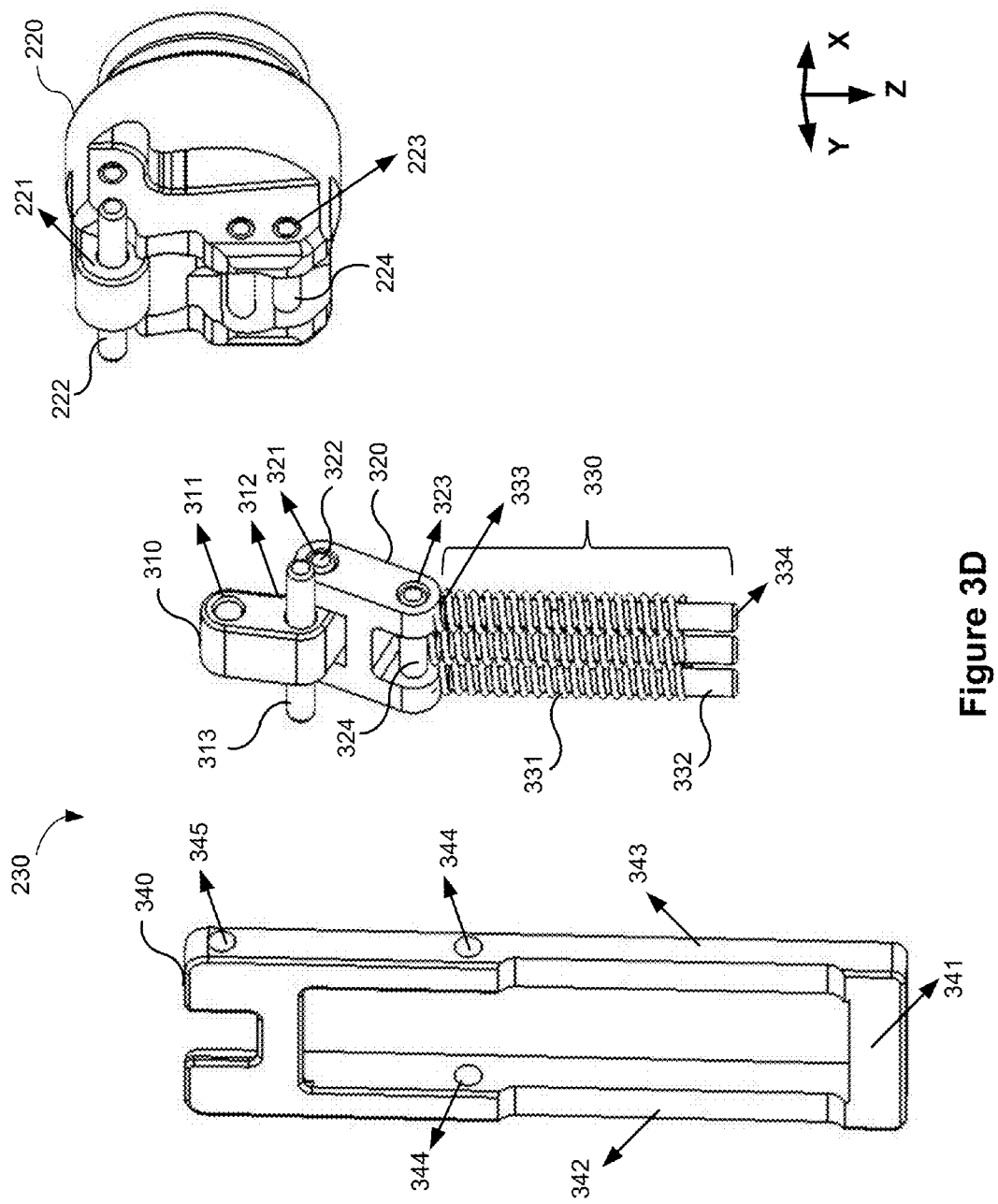
FIGS. 3D-3E are perspective views of a plurality of members of a four-bar linkage and a strap connector of an audio headphone in accordance with some embodiments.
Figure 3E:
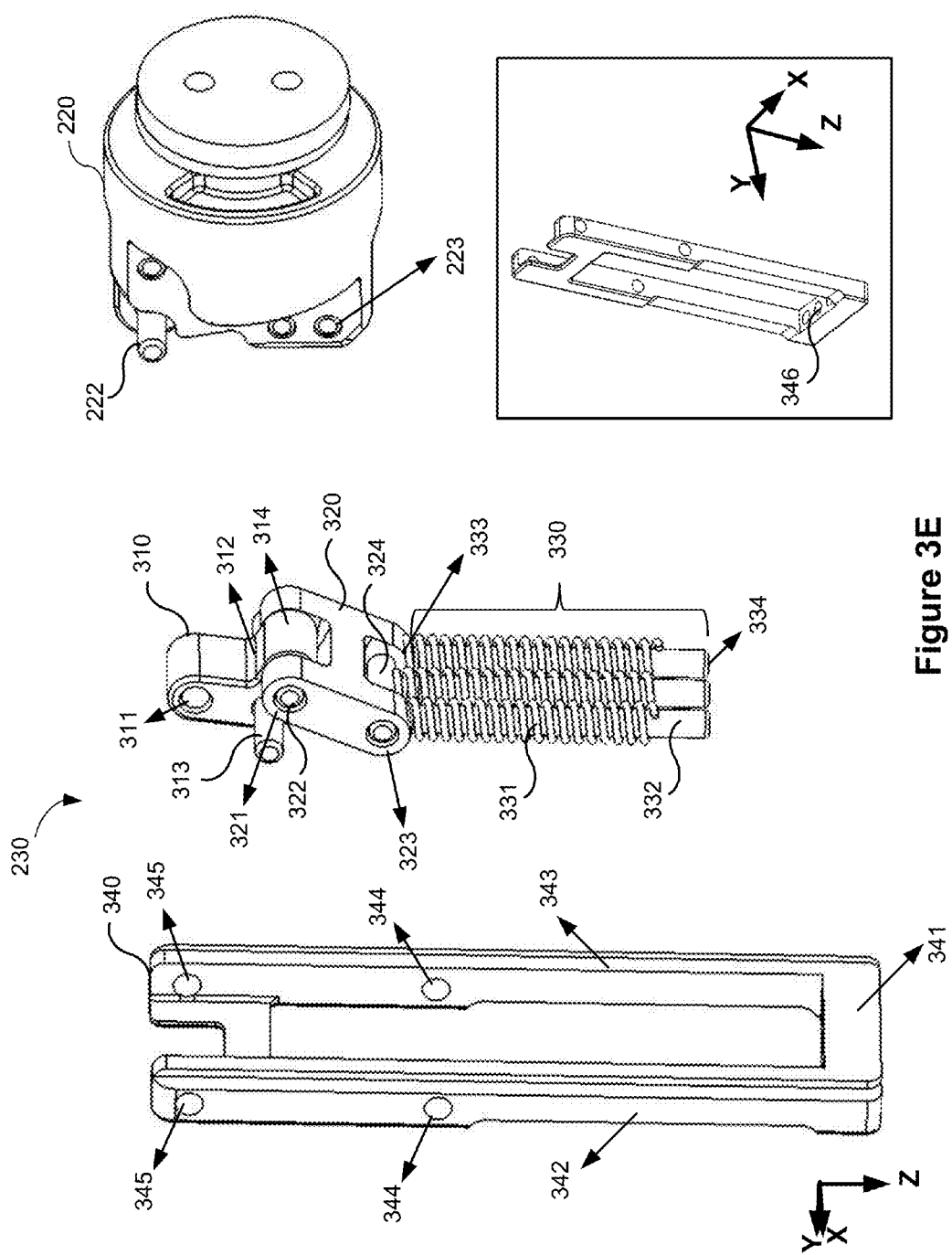

FIGS. 3B-3C are perspective views of the four-bar linkage 230 coupled with the strap connector 220 of the audio headphone 200. FIGS. 3D-3E are perspective views of a plurality of members of the four-bar linkage 230 and the strap connector 220. In some embodiments, the four-bar linkage 230 comprises a first member 310, a second member 320, a third member 330, and a fourth member 340. FIGS. 3F-3G are perspective views of the four-bar linkage 230 comprising the spring cover 270 in accordance with some embodiments.

As shown in FIGS. 3B-3E, in some embodiments, the first member 310 is a rigid member coupled to the strap connector 220 via a joint 301 (e.g., FIG. 3B). In some embodiments, the joint 301 is a hinge joint, such as a knuckle joint. For example, as shown in FIG. 3D, an end portion 311 of the first member 310 is perforated with an eye that can fit between two perforated portions (e.g., projections) 223 of the strap connector 220. A pin 224 fastens the end portion 311 of the first member 310 to the perforated portions 223 of the strap connector 220 by inserting the pin 224 through the eyes to allow pivoting of the first member 310 relative to the strap connector 220 at the joint 301.

As shown in FIG. 3C, in some embodiments, the second member 320 is a rigid member coupled to the first member 310 via a joint 302. As shown in FIGS. 3D-3E, the second member 320 has two end portions 321 and 323 that are opposite to each other. In some embodiments, each of the end portions 321 and 323 has two perforated projections. In some embodiments, the joint 302 is a hinge joint, such as a knuckle joint. For example, as shown in FIG. 3E, an end portion 314 of the first member 310 is perforated with an eye that can fit between two perforated projections on the end portion 321 of the second member 320. A pin 322 fastens the end portion 314 of the first member 310 to the perforated projections of the end portion 321 of the second member 320 by inserting the pin 322 through the eyes to allow pivoting between the first member 310 and the second member 320 at the joint 302.

In some embodiments, the third member 330 comprises one or more rigid poles 332 extending from the end portion 323 of the second member 320 to a portion 341 of the fourth member 340. In some embodiments, when the third member 330 comprises a plurality of rigid poles 332, the individual rigid poles are parallel to each other. Each of the one or more rigid poles 332 is surrounded by an elastic spring 331. In some embodiments, the one or more elastic springs 331 of the third member 330 provide forces to pivot between the bi-stable states and hold at the in-use position 202 or the out-of-use position 204 as illustrated in FIG. 3A.

As shown in FIGS. 3B, 3F and 3G, the third member 330 is coupled to the second member 320 via a joint 303. For example, the spring cover 270 comprises a front cover 271, a rear cover 272, and a top perforation 273 as shown in FIG. 3F. The front cover 271 comprises a plurality of grooves 274 on the inside of the front cover 271 for resting the rigid poles 332 surrounded by the elastic springs 331 of the third member 330. The rear cover 272 includes a plurality of holes 275 beneath the top perforation 273 for inserting the rigid poles 332 to couple the third member 330 with the spring cover 270. A pin 324 (e.g., as shown in FIGS. 3D-3E) fastens the top perforation 273 of the spring cover 270 to the perforated projections on the end portion 323 of the second member 320 by inserting the pin 324 through the eyes to couple the spring cover 270 with the second member 320 at the joint 303. As the spring cover 270 is coupled with the third member 330, the third member 330 is coupled with the second member 320, such that a pivoting motion can be provided between the second member 320 and the third member 330 relative to each other at the joint 303.

As shown in FIGS. 3D-3E, in some embodiments, the fourth member 340 is a rigid member coupled to the third member 330. For example, the fourth member 340 is a frame-shaped member. One or more holes 346 (e.g., as shown in the inset figure of FIG. 3E) are formed on the portion 341 of the fourth member 340. An end portion 334 of each rigid pole 332 is inserted into a hole 346 to couple the third member 330 with the fourth member 340. In some embodiments, the rigid pole 332 may go through the hole 346 and extend beyond the portion 341 of the fourth member 340. The fourth member 340 also has two sides 342 and 343 that are connected by the portion 341 and by another portion higher on the fourth member 340. The two sides 342 and 343 extend along a vertical dimension (e.g., along Z dimension).

As shown in FIG. 3B, in some embodiments, the fourth member 340 is further coupled to the first member 310 via a joint 304. In some embodiments, the joint 304 is a hinge joint, such as a knuckle joint. For example, as shown in FIGS. 3D-3E, the two sides 342 and 343 of the fourth member 340 has two perforated mid portions 344. The first member 310 includes a bend at a mid portion 312, and the mid portion 312 is perforated with an eye that can fit between the two perforated mid portions 344 of the fourth member 340. A pin 313 fastens the mid portion 312 of the first member 310 to the two perforated mid portions 344 of the fourth member 340 by inserting the pin 313 through the eyes to allow pivoting of the first member 310 relative to the fourth member 340 at the joint 304.

As shown in FIG. 3B, in some embodiments, the fourth member 340 is also coupled to the strap connector 220 via a joint 305. For example as illustrated in FIG. 3D, two perforated projections on a portion 345 of the fourth member 340 are coupled to the strap connector 220 via the joint 305. In some embodiments, the joint 305 is a hinge joint, such as a knuckle joint. For example, a portion 221 of the strap connector 220 is perforated with an eye that can fit between the two perforated projections on the portion 345 of the fourth member 340. A pin 222 fastens the portion 221 of the strap connector 220 to the perforated projections of the portion 345 of the fourth member 340 by inserting the pin 222 through the eyes to allow pivoting of the fourth member 340 relative to the strap connector 220 at the joint 305.

As discussed above, the four-bar linkage 230 has pivoting motions at the joints 301-305. The combination and coordination of the pivoting motions at the joints 301-305 allow the audio headphone 200 to pivot between the in-use position 202 and the out-of-use position 204 as illustrated in FIG. 3A. Although the four-bar linkage 230 is coupled to the strap connector 220 via the joint 301 and the joint 305 as shown in FIGS. 3B-3C, it is to be understood that the four-bar linkage 230 can be coupled to the strap connector 220 in any other suitable mechanisms to provide the pivoting motions.

Figure 4A:
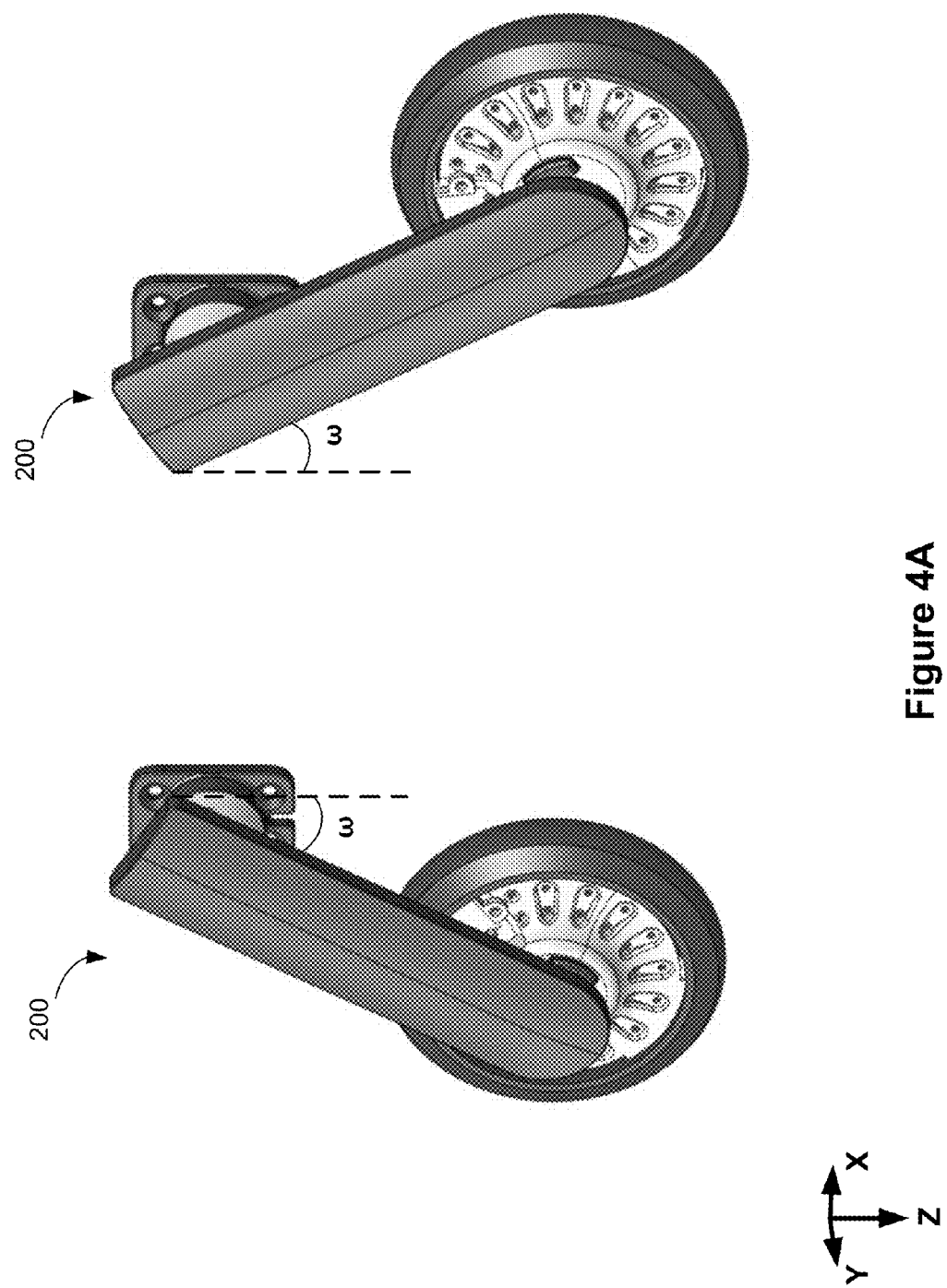
FIG. 4A is a perspective view illustrating rotational motions of an audio headphone in accordance with some embodiments.

FIG. 4A is a perspective view illustrating rotational motions of the audio headphone 200 in accordance with some embodiments. In some embodiments, the strap connector 220 coupled with the four-bar linkage 230 allows the headphone speaker to rotate within a vertical plane (e.g., the X-Z plane). In some embodiments, the rotation angle ω of the headphone speaker is in a range from −30° to 30° within the vertical plane (e.g., the X-Z plane). In FIG. 4A, the rotation angle ω in the clockwise is positive, and the rotation angle ω in the counter-clockwise is negative.

FIGS. 4B-4E are perspective views of the mounting bracket 250 and the strap connector 220 coupled to the four-bar linkage 230 of the audio headphone 200. In some embodiments, the strap connector 220 comprises a cylindrical component that is rotatable with respect to the mounting bracket 250. Although the strap connector 220 is shown to be a cylindrical shaped component, it is to be understood that the strap connector 220 can have any other suitable shape. For example, the strap connector may not be rotatable with respect to the mounting bracket 250 in accordance with some embodiments.

Figure 4D:
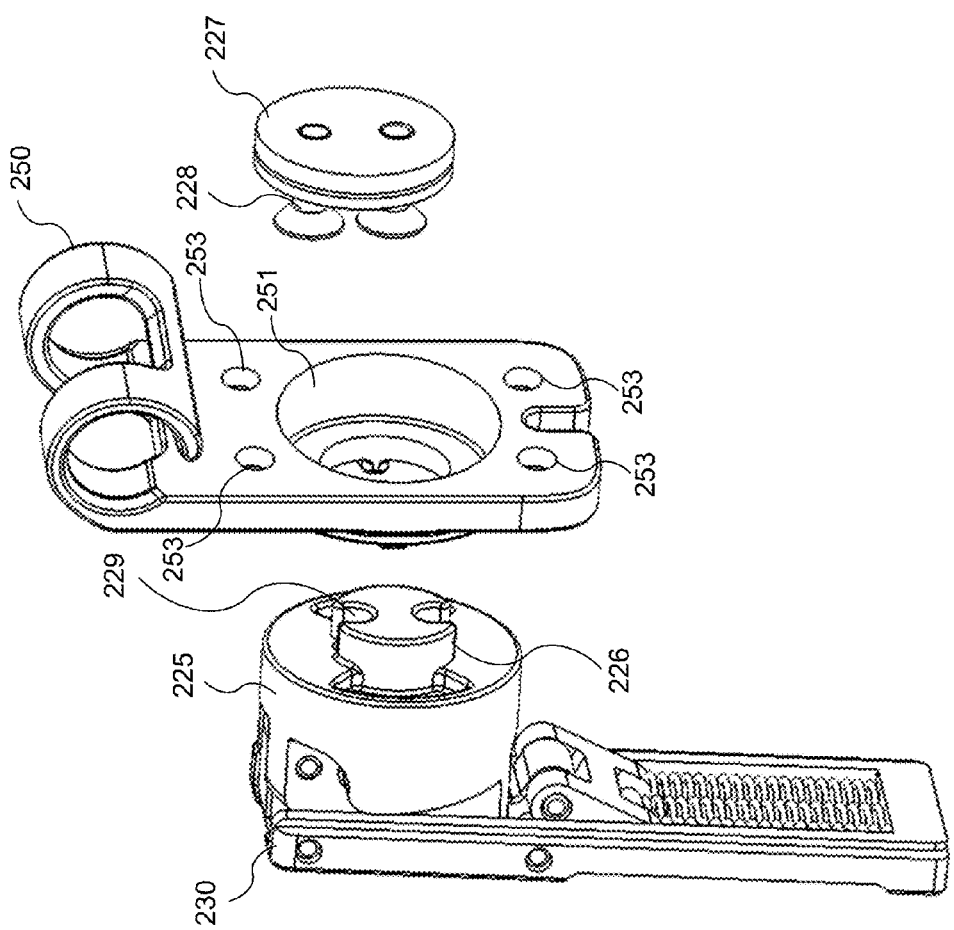

As shown in FIGS. 4C and 4D, the strap connector 220 comprises a base part 225, a protruding part 226 that protrudes from the center of the base part 225, and a cap 227 for coupling the mounting bracket 250 with the strap connector 220. The base part 225 is coupled to (e.g., fixedly connected to) the four-bar linkage 230 to transmit the rotational motion from the strap connector 220 to the four-bar linkage 230 and the frame 240, such that the frame 240 and the headphone speaker 210 are rotatable relative to the mounting bracket 250 within the vertical plane (e.g., the X-Z plane). For example, as discussed with reference to FIGS. 3D-3E, the perforated projections on the portion 345 of the fourth member 340 are coupled to the perforated portion 221 of the strap connector 220 via the joint 305. The end portion 311 of the first member 310 is coupled to the perforated portions 223 of the strap connector 220 via the joint 301.

In some embodiments, the strap connector 220 further comprises an electrical connection mechanism to electrically couple the audio headphone 200 with the strap for the head-mounted display. For example, two pins 228 coupling the cap 227, through an opening 254 in the mounting bracket 250, with the protruding part 226 and the base part 225 can provide electrical connection. The protruding part 226 and the base part 225 may form holes 229 for inserting the pins 228 into the base part 225. The cap 227 and/or the pins 228 may be further electrically connected to conductors on the strap to provide electrical connection between the audio headphone 200 and the strap for the head-mounted display.

Figure 4E:
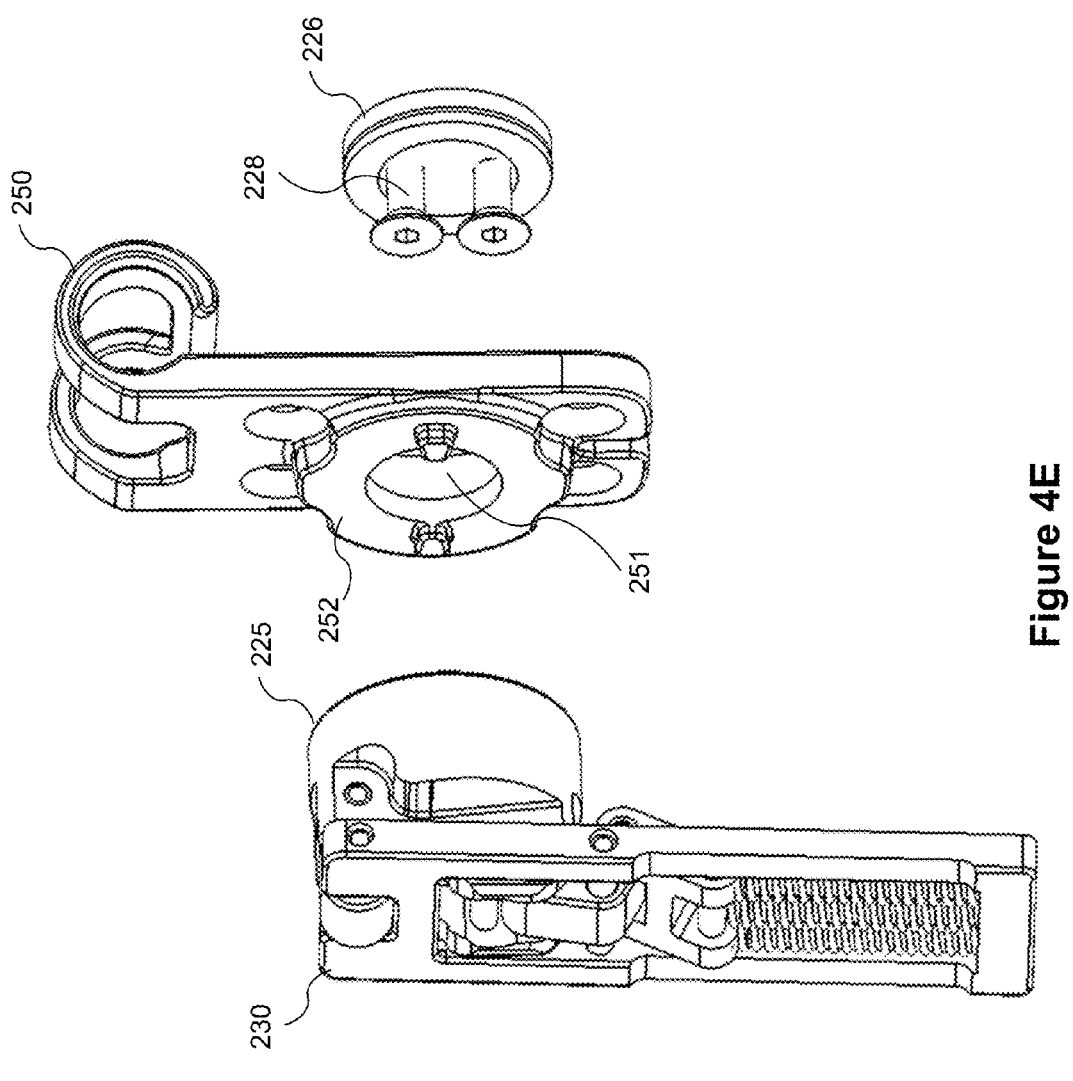

As shown in FIG. 4D, the mounting bracket 250 has an aperture 251 sized on one side to engage with the cap 227 of the strap connector 220 and sized on the other side to engage with the protruding part 226. As shown in FIG. 4E, the mounting bracket 250 also has a projecting portion 252, through which the aperture 251 extends, that projects from the other side of the mounting bracket 250 to engage with the base part 225 and the protruding part 226 of the strap connector 220. The cap 227 is further coupled to the protruding part 226 and the base part 225 through the aperture 251 in the mounting bracket 250 using, for example, the pins 228. This structure allows a rotational motion of the strap connector 220 relative to the mounting bracket 250 as illustrated in FIG. 4A.

Figure 6A:
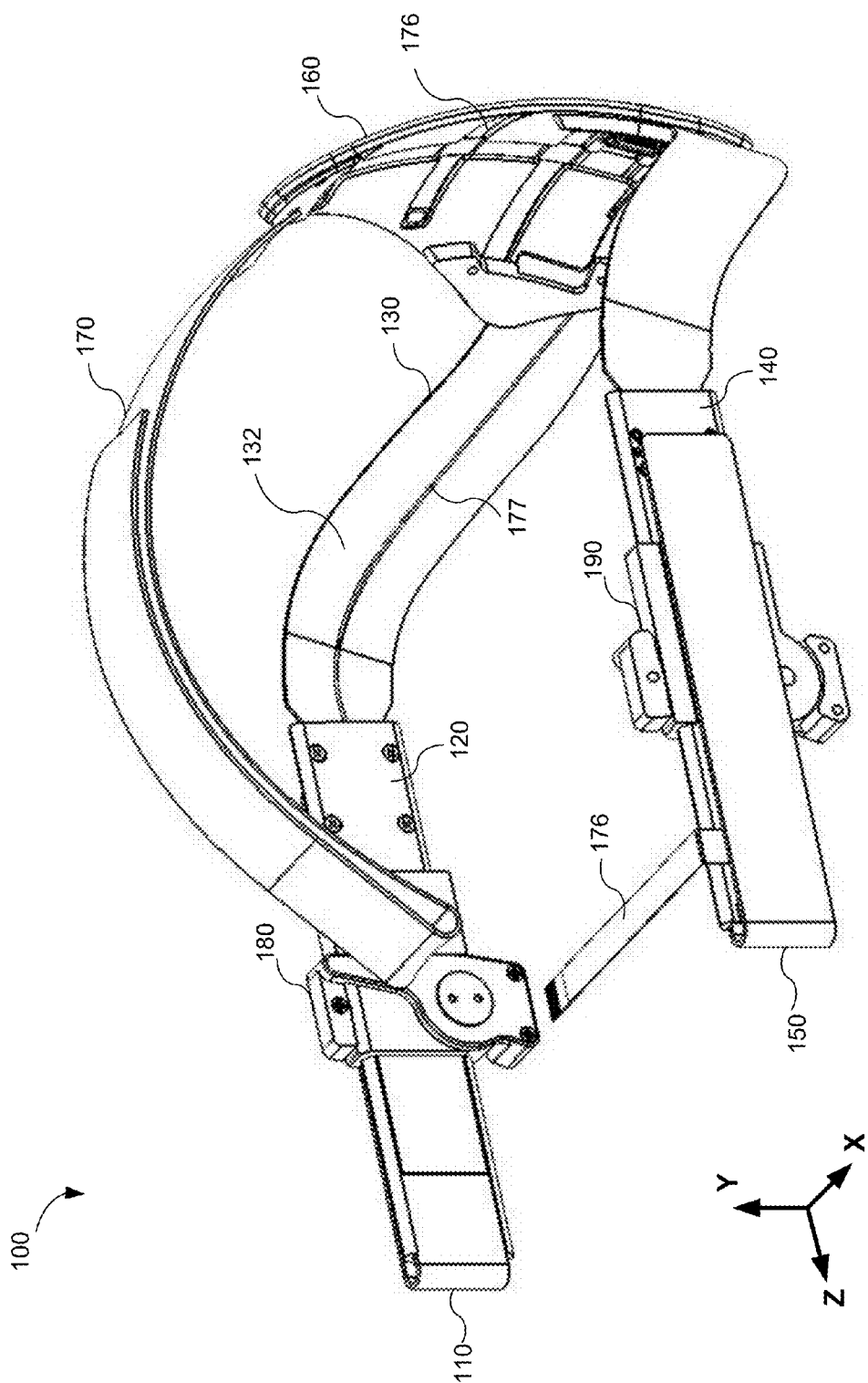
FIG. 6A is a perspective view of a strap system for a head-mounted display in accordance with some embodiments.
Figure 6B:
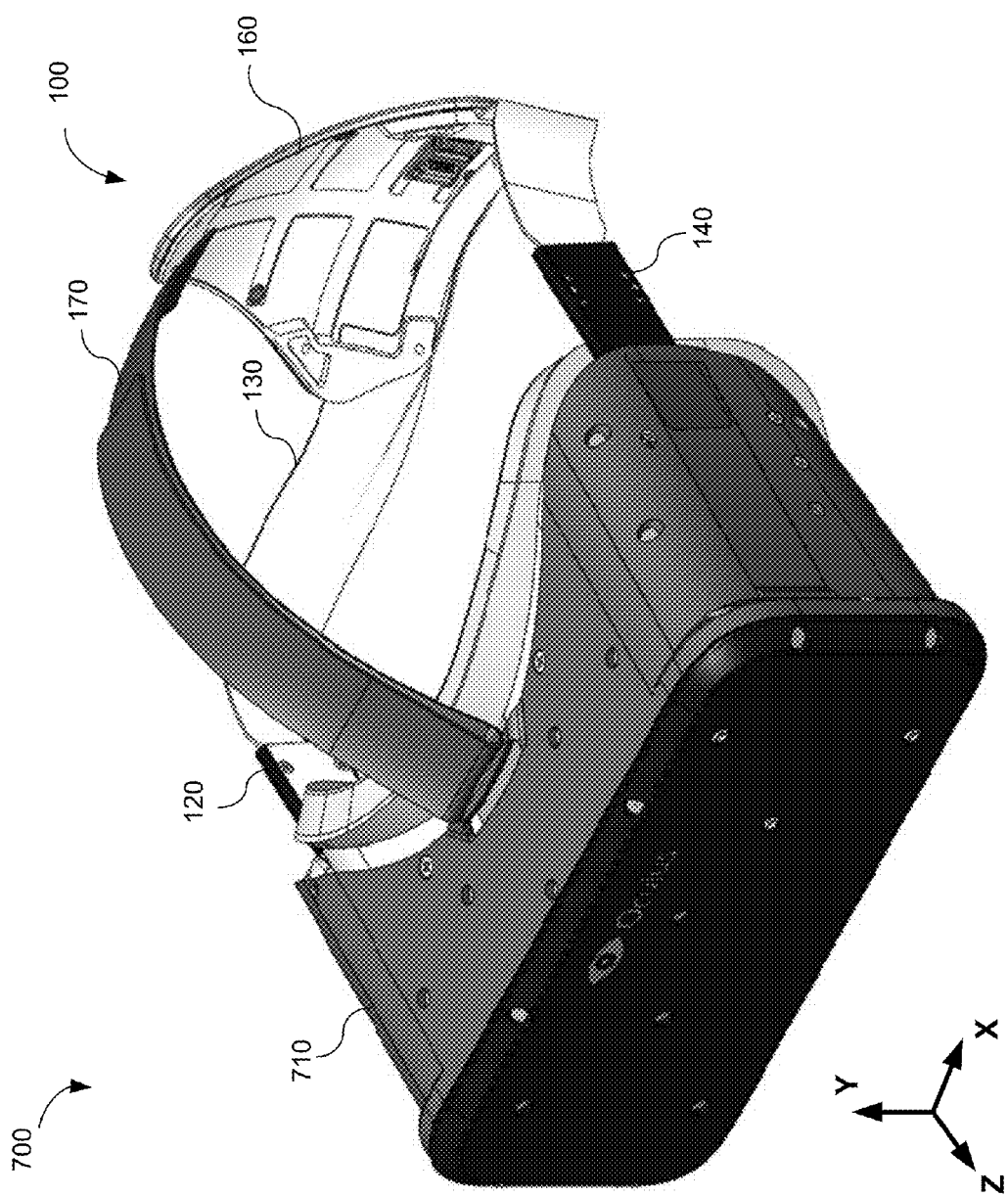
FIG. 6B is a perspective view of a head-mounted display system comprising a strap system coupled with a head-mounted display in accordance with some embodiments.
Figure 6C:
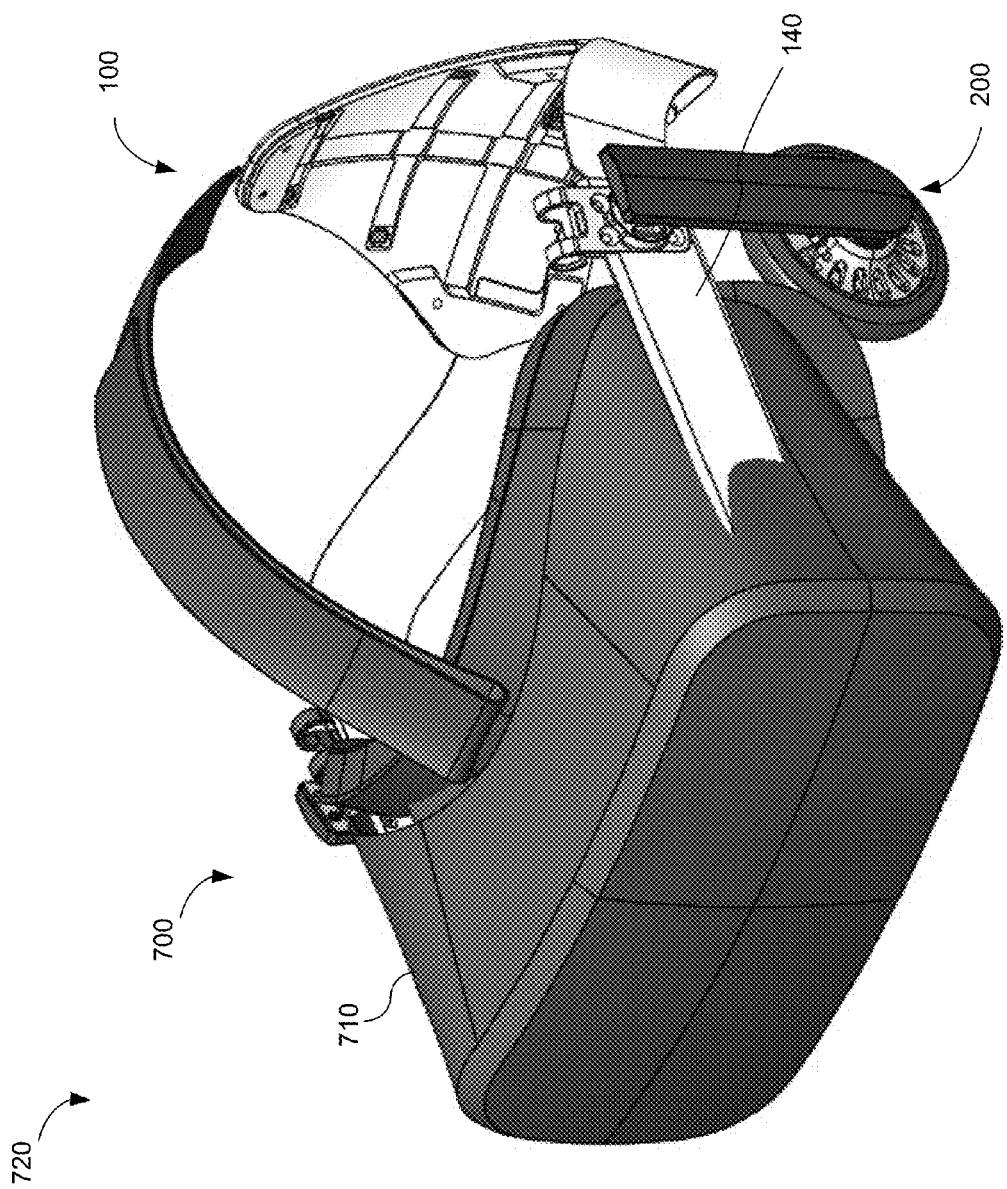
FIG. 6C is a perspective view of a head-mounted system comprising a head-mounted display system coupled with audio headphones in accordance with some embodiments.

In some embodiments, the mounting bracket 250 is connectable to the strap for a head-mounted display (e.g., as shown in FIG. 6C). For example, the mounting bracket 250 can be screwed to the strap via screw holes 253. The mounting bracket 250 can also be coupled to the strap using any other suitable method, such as clipping onto the strap. In some embodiments, the mounting bracket 250 can have any other suitable shape or structures. In some embodiments, the mounting bracket 250 may further comprise a cable organizer (not shown) to store and organize electrical connection cables of the audio headphone 200. The mounting bracket is an example of a mount that connects to the strap. In some embodiments, the mounting bracket (or other mount) is optional for the audio headphone 200, and the strap connector 220 is directly connectable to a strap of the head-mounted display.

Figure 5A:
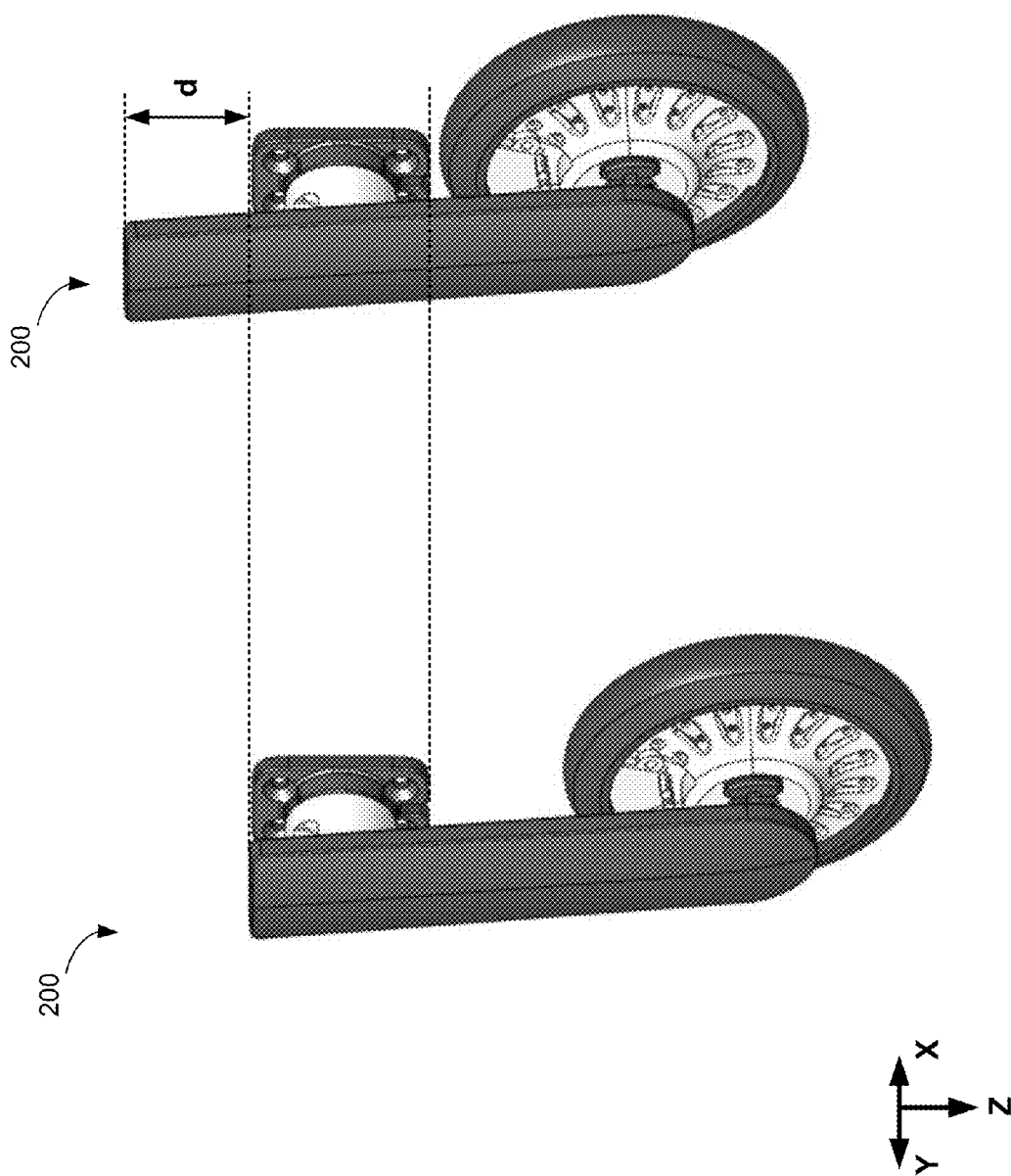
FIG. 5A is a perspective view illustrating sliding motions of an audio headphone in accordance with some embodiments.
Figure 5B:
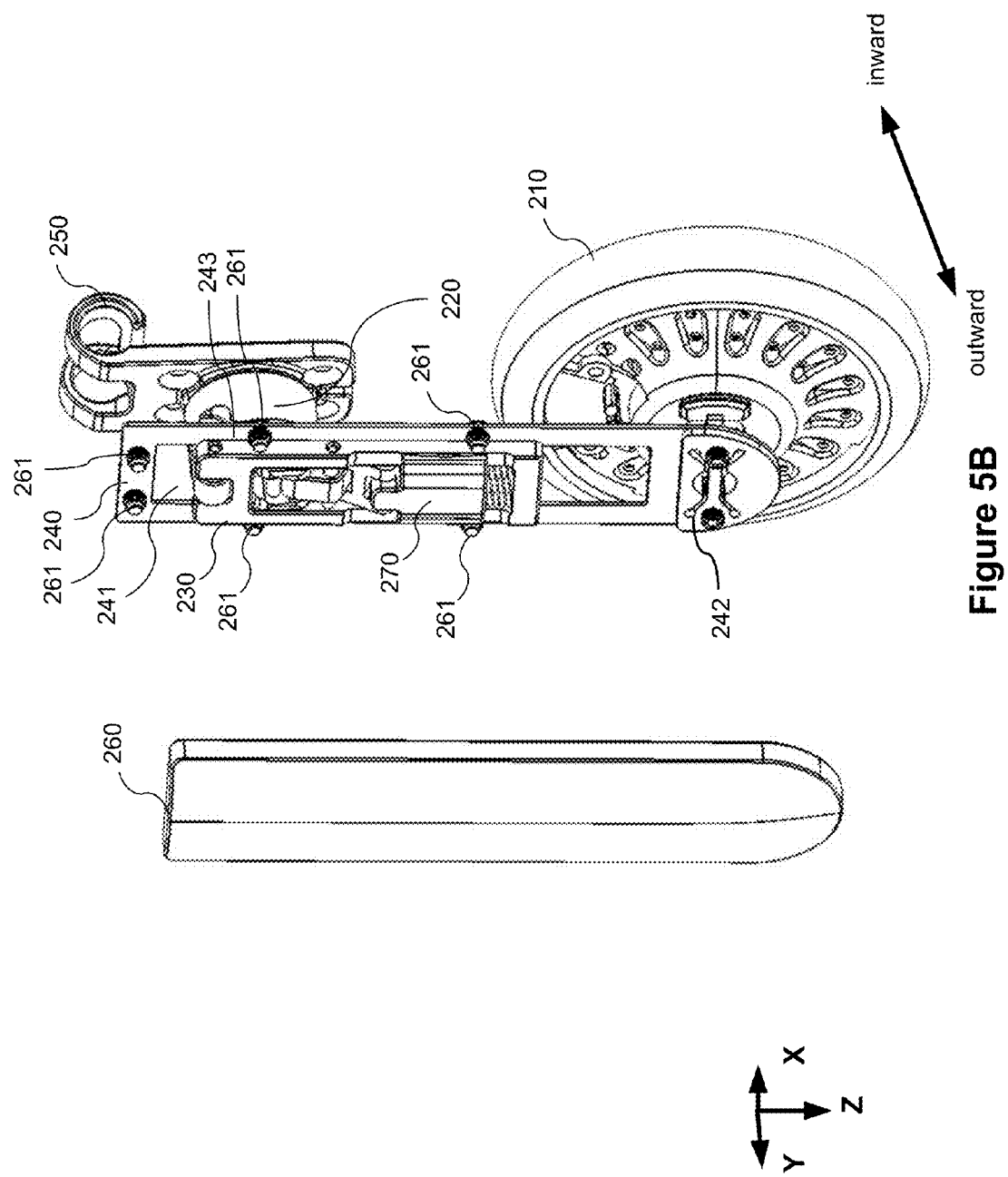

FIG. 5A is a perspective view illustrating sliding motions of the audio headphone 200 in accordance with some embodiments. FIGS. 5B-5C are perspective views of the frame 240 and the strap connector 220 coupled to the four-bar linkage 230 of the audio headphone 200. In some embodiments, the four-bar linkage 230 is coupled to the strap connector 220 through an opening 241 in the frame 240. The headphone speaker 210 is mounted on a portion 242 of the frame 240 from an inward side closer to the user's ear using any suitable method. For example, the headphone speaker 210 is screwed to the portion 242 of the frame 240. As shown in FIG. 5B, the portion 242 is below the opening 241. The four-bar linkage 230 is located at a portion 243 of the frame 240. The portion 242 and the portion 243 of the frame 240 are apart from each other for a certain space along the vertical dimension (e.g., the Z dimension).

As shown in FIG. 5B, in some embodiments, the four-bar linkage 230 is located against an outward side of the frame 240 (e.g., the outward side is located away from the user's ear). The strap connector 220 is located against the inward side of the frame 240 (e.g., the inward side is near the user's ear). In some alternative embodiments, the frame 240 may include grooves (not shown) for the fourth member 340 of the four-bar linkage 230 to fit within the opening 241 of the frame 240.

In some embodiments as shown in FIGS. 5A and 5C, the frame 240 coupled with the headphone speaker 210 can slide upward and downward with respect to the four-bar linkage 230 and the strap connector 220. For example, the frame 240 may slide for a distance d in a range from 0 mm to 25 mm. In some embodiments, a friction between the four-bar linkage 230 and the frame 240 is used to hold a position during sliding.

As shown in FIG. 5B, in some embodiments, the cover piece 260 is fixedly connected to the frame 240 to cover the frame 240 and the four-bar linkage 230 from the outward side. A space may be formed between the cover piece 260 and the opening 241 for housing the four-bar linkage 230. For example, the cover piece 260 is attached to the fame 240 using screws 261. In some embodiments, the space between the cover piece 260 and the opening 241 may further house electrical cables to provide electrical connection between the audio headphone 200.

FIG. 6A is a perspective view of a strap system 100 for a head-mounted display. FIG. 6B is a perspective view of a head-mounted display system 700 comprising the strap system 100 coupled with the head-mounted display 710. The strap system 100 is used for mounting the head-mounted display 710 on a user's head. The strap system 100 comprises a flexible segment 110, a rigid guide segment 120, a semi-rigid segment 130, a rigid guide segment 140, and a flexible segment 150 that are coupled to each other to adjustably wrap around side and back portions of the user's head.

In some embodiments, the rigid guide segments 120 and 140 are connectable to the head-mounted display 710. The flexible segments 110 and 150 are stretchable within the rigid guide segments 120 and 140 respectively along the lateral dimension (e.g., Z dimension in FIG. 6A) so as to adjust the strap system 100 in accordance with the user's head.

In some embodiments, the strap system 100 may comprise a single and continuous semi-rigid segment 130 including two arc portions. Alternatively, the strap system 100 may comprise two separate and symmetric semi-rigid segments each including an arc portion. As shown in FIG. 6A, the semi-rigid segment 130 comprises an arc portion 132 to extend from above a user's ears to below the user's occipital lobe to conform to a portion of the user's head.

In some embodiments, the strap system 100 comprises a rigid piece 160 which can be coupled with the semi-rigid segment 130 to rest against the back of the user's head (e.g., around the user's occipital lobe). In some embodiments, the strap system 100 includes a top strap 170 coupled to the rigid piece 160 and the head-mounted display 710 to adjustably conform to the top of the user's head when the user is wearing the head-mounted display. In some embodiments, the strap system 100 includes flat flexible circuits 176 and electric cables 177 extending along the rigid guide segment 120, the semi-rigid segment 130, the rigid piece 160, and the rigid guide segment 140, to provide power management and/or other functionalities to the head-mounted display 710 and/or the audio headphone 200. In some embodiments, mounting devices 180 and 190 are attached to the rigid guide segments 120 and 140 respectively, to connect the strap system 100 to the head-mounted display 710. Various embodiments of the strap system 100 and the head-mounted display system 700 are described in U.S. patent application Ser. No. 14/603,335, filed on Jan. 22, 2015, the disclosure of which is incorporated herein by reference in its entirety.

FIG. 6C is a perspective view of a head-mounted system 720 comprising the head-mounted display system 700 coupled with audio headphone 200. The audio headphone 200 is integrated with the head-mounted display system 700 for providing both visual and audio virtual reality experiences to the user. The head-mounted system 720 comprises the head-mounted display 710, the strap system 100 coupled with the head-mounted display 710 as discussed with reference to FIGS. 6A-6B, and the audio headphone 200 coupled with the strap system 100. In some embodiments, the strap connector 220, or the mounting bracket 250 of the audio headphone 200 can be coupled with a rigid guide segment (e.g., the rigid guide segment 140 in FIG. 6C) to mount the audio headphone 200 to the strap system 100 as discussed with reference to FIGS. 4C-4E. Although not shown due to the perspective, the head-mounted system 720 may have two audio headphones located on left and right sides to provide audio signals to the user's left and right ears. Each of the left and right audio headphones may comprise a strap connector or a mounting bracket for coupling the audio headphone to the corresponding rigid guide segment of the stray system 100.

The audio headphone 200 as discussed in the present disclosure can be coupled to a strap system and integrated with a head-mounted display to provide an immersive experience while the user is playing video games. The audio headphone 200 is designed to have multiple degrees of freedom to adjust the position of the audio headphone 200 to fit different users. The four-bar linkage coupled with the strap connector allows the headphone speaker to pivot inward and outward relative to the user's ear between an in-use state and an out-of-use state. The strap connector provides a rotating feature where the headphone speaker can rotate within a vertical plane. The frame coupled with the headphone speaker can slide upward and downward to adjust the height of the headphone speaker. These multiple degrees of freedom help to ensure a good fit of the headphone speakers on the user's head. Also, the outward pivoting allows the headphone speakers to be removed from the user's ear without taking off the strap and head-mounted display.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An audio headphone to couple to a strap for a head-mounted display, the audio headphone comprising:
   a headphone speaker;
   a strap connector; and
   a four-bar linkage coupled to the strap connector to provide inward and outward movement of the headphone speaker with respect to a user's ear, the four-bar linkage comprising a first member, a second member, a third member, and a fourth member, wherein:
   the first member has a first end portion coupled to the strap connector via a first joint;
   the second member has a first end portion coupled to a second end portion of the first member via a second joint;
   the third member has a first end portion coupled to a second end portion of the second member via a third joint, the third member comprising a rigid pole extending from the second member to the fourth member and surrounded by an elastic spring; and
   the fourth member has a first portion coupled to the rigid pole and first and second sides that are connected by the first portion and that extend along a vertical dimension, wherein:
   the first member is further coupled to the first and second sides of the fourth member via a fourth joint; and
   the fourth member has a second portion coupled to the strap connector via a fifth joint.

2. The audio headphone of claim 1, wherein the inward and outward movement includes movement between a first stable position inward from a vertical plane in a range from −1° to −10°, and a second stable position outward from the vertical plane in a range from 25° to 35°.

3. The audio headphone of claim 1, wherein the first member includes a bend at a mid portion, the mid portion of the first member coupled to mid portions of the first and second sides of the fourth member at the fifth joint.

4. The audio headphone of claim 1, wherein:
   the rigid pole is a first rigid pole; and
   the four-bar linkage comprises a plurality of parallel rigid poles, including the first rigid pole, extending between the second end of the second member and the first portion of the fourth member, each rigid pole of the plurality of parallel rigid poles being surrounded by a respective elastic spring.

5. The audio headphone of claim 1, further comprising:
   a frame, coupled to the headphone speaker, wherein:
   the four-bar linkage is coupled to the strap connector through an opening in the frame; and
   the headphone speaker is mounted on the frame below the opening.

6. The audio headphone of claim 5, wherein the frame is to slide upward and downward with respect to the four-bar linkage and the strap connector.

7. The audio headphone of claim 6, wherein the frame is to slide upward and downward with respect to the four-bar linkage and the strap connector for a distance in a range from 0 mm to 25 mm.

8. The audio headphone of claim 5, further comprising:
   a cover piece fixedly attached to the frame to cover the frame and the four-bar linkage from an outward side away from the user's ear, a space being formed between the cover piece and the frame for housing the four-bar linkage.

9. The audio headphone of claim 5, wherein:
the audio headphone further comprises a mount; and
the strap connector comprises a cylindrical component that is rotatable with respect to the mount.

10. The audio headphone of claim 9, wherein:
the cylindrical component comprises a base part and a protruding part that protrudes from the base part; and
the base part is fixedly connected to the four-bar linkage to transmit rotational motion from the cylindrical component to the four-bar linkage and the frame, such that the frame and the headphone speaker are rotatable relative to the mount for the head-mounted display within a vertical plane.

11. The audio headphone of claim 9, wherein the frame and the headphone speaker are rotatable relative to the mount in a range from −30° to 30° within a vertical plane.

12. The audio headphone of claim 9, wherein:
the mount comprises a mounting bracket having structures for engaging the protruding part of the cylindrical component such that the cylindrical component is rotatable with respect to the mounting bracket, and
the mounting bracket is fixedly connectable to the strap to connect the audio headphone to the strap for the head-mounted display.

13. The audio headphone of claim 1, wherein the strap connector comprises an electrical connection to electrically couple the audio headphone with the strap for the head-mounted display.

14. A head-mounted system providing virtual reality experience for a user, the head-mounted system comprising:
a head-mounted display;
a strap system for mounting the head-mounted display on the user's head, the strap system comprising:
first and second flexible segments that are stretchable;
first and second rigid guide segments coupled to the first and second flexible segments respectively, the first and second rigid guide segments further connected to the head-mounted display, wherein the first and second flexible segments are stretchable within the first and second rigid guide segments respectively along the lateral dimension so as to adjust the strap system in accordance with the user's head; and
at least one semi-rigid segment, coupled to the first and second rigid guide segments, to conform to a portion of the user's head, the at least one semi-rigid segment comprising arc portions to extend from above the user's ears to below the user's occipital lobe; and
first and second audio headphones coupled to the strap system and integrated with the head-mounted display, each of the first and second audio headphones comprising:
a headphone speaker;
a strap connector coupling the audio headphone to the first or second rigid guide segment of the strap system; and
a four-bar linkage, coupled to the strap connector, to provide inward and outward movement of the headphone speaker with respect to a user's ear, the four-bar linkage comprising a first member, a second member, a third member, and a fourth member, wherein:
the first member has a first end coupled to the strap connector via a first joint;
the second member has a first end coupled to a second end of the first member via a second joint;
the third member has a first end coupled to a second end of the second member via a third joint, the third member comprising a rigid pole extending from the second member to the fourth member and surrounded by an elastic spring; and
the fourth member has a first portion coupled to the rigid pole and first and second sides that are connected by the first portion and that extend along a vertical dimension, wherein:
the first member is further coupled to the first and second sides of the fourth member via a fourth joint; and
the fourth member has a second portion coupled to the strap connector via a fifth joint.

15. The head-mounted system of claim 14, wherein the inward and outward movement of the headphone speaker includes movement between a first stable position inward from a vertical plane in a range from −1° to −10°, and a second stable position outward from the vertical plane in a range from 25° to 35°.

16. The head-mounted system of claim 14, wherein each of the first and second audio headphones further comprises:
a frame, coupled to the headphone speaker, wherein:
the four-bar linkage is coupled to the strap connector through an opening in the frame,
the headphone speaker is mounted on the frame below the opening, and
the frame is to slide upward and downward with respect to the four-bar linkage and the strap connector for a distance in a range from 0 mm to 25 mm.

17. The head-mounted system of claim 16, wherein:
each of the first and second the audio headphones comprises a mount to couple the audio headphone to the rigid guide segment of the strap system; and
the strap connector of each of the first and second the audio headphones comprises a cylindrical component that is rotatable with respect to the mount.

18. The head-mounted system of claim 17, wherein:
the cylindrical component comprises a base part and a protruding part that protrudes from the base part; and
the base part is fixedly connected to the four-bar linkage to transmit rotational motion from the cylindrical component to the four-bar linkage and the frame, such that the frame and the headphone speaker are rotatable relative to the mount in a range from −30° to 30° within a vertical plane.

19. The head-mounted system of claim 14, wherein the strap connector comprises an electrical connection to electrically couple each of the first and second the audio headphones with the strap system for the head-mounted display.

20. An audio headphone arm to couple to a strap for a head-mounted display, the audio headphone arm comprising:
a four-bar linkage to provide inward and outward movement of the audio headphone arm with respect to a user's ear, the four-bar linkage comprising a first member, a second member, a third member, and a fourth member, wherein:
the first member includes a bend at a mid portion;
the second member has a first end coupled to an end of the first member via a first joint;
the third member has a first end coupled to a second end of the second member via a second joint, the third member comprising a rigid pole extending from the second member to the fourth member and surrounded by an elastic spring; and the fourth member has a first portion connected to the rigid pole and first and second sides that are connected by the first portion and that extend along a vertical dimension, the mid portion of the first member coupled to mid portions of the first and second sides of the fourth member at a third joint; and a frame to couple to a headphone speaker, wherein:
the four-bar linkage is to couple to a strap connector through an opening in the frame; and
the frame is to slide upward and downward with respect to the four-bar linkage.

* * * * *

UNITED STATES PATENT AND TRADEMARK OFFICE
CERTIFICATE OF CORRECTION

PATENT NO.        : 9,635,450 B2
APPLICATION NO.   : 14/627639
DATED             : April 25, 2017
INVENTOR(S)       : Drinkwater et al.

It is certified that error appears in the above-identified patent and that said Letters Patent is hereby corrected as shown below:

In the Claims

Claim 12, Column 11, Line 20, please delete "claim 9, wherein" and insert --claim 10, wherein--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*